(12) United States Patent
Piazza et al.

(10) Patent No.: US 10,711,892 B2
(45) Date of Patent: Jul. 14, 2020

(54) GEARBOX FOR A MOTOR VEHICLE

(71) Applicant: C.R.F. SOCIETA CONSORTILE per AZIONI, Orbassano (Turin) (IT)

(72) Inventors: Andrea Piazza, Turin (IT); Gianluigi Pregnolato, Moncalieri (IT); Lawrence Laba, Lake Orion, MI (US)

(73) Assignee: C.R.F. Societá Consortile per Azioni, Orabassano (Turin) (IT)

( * ) Notice: Subject to any disclaimer, the term of this patent is extended or adjusted under 35 U.S.C. 154(b) by 722 days.

(21) Appl. No.: 15/390,091

(22) Filed: Dec. 23, 2016

(65) Prior Publication Data

US 2017/0108120 A1    Apr. 20, 2017

Related U.S. Application Data

(63) Continuation of application No. 14/184,259, filed on Feb. 19, 2014, now Pat. No. 9,551,417.

(30) Foreign Application Priority Data

Apr. 3, 2013   (EP) .................................... 13162151

(51) Int. Cl.
*F16H 63/34*      (2006.01)
*F16H 61/682*     (2006.01)
(Continued)

(52) U.S. Cl.
CPC ............ *F16H 63/34* (2013.01); *F16H 61/16* (2013.01); *F16H 61/682* (2013.01);
(Continued)

(58) Field of Classification Search
CPC ........ F16H 63/34; F16H 61/16; F16H 61/682; F16H 2061/166; F16H 2063/3076
See application file for complete search history.

(56) References Cited

U.S. PATENT DOCUMENTS 5,052,239 A * 10/1991 Ubagai .................. F16H 61/26
                                                                74/473.36
5,704,251 A *  1/1998 Alber ...................... F16H 63/20
                                                                74/325

(Continued)

FOREIGN PATENT DOCUMENTS

CN    102510962 A    6/2012
CN    102797838 A   11/2012
(Continued)

OTHER PUBLICATIONS

European Patent Office, Communication pursuant to Article 94(3) EPC, dated May 30, 2017.
(Continued)

*Primary Examiner* — Zakaria Elahmadi
(74) *Attorney, Agent, or Firm* — Heslin Rothenberg Farley & Mesiti P.C.; Victor A. Cardona, Esq.

(57) ABSTRACT

Described herein is a gearbox for a motor vehicle including a plurality of forward gear ratios and a reverse gear ratio, the gearbox further including:
  a control device (configured for controlling the selection and the engagement of said forward gear ratios and of said reverse gear ratio; and
  a plurality of engagement devices that can be controlled by means of said control device for engaging the forward gear ratios or reverse gear ratio (RM) of the gearbox that are operatively associated to said devices.
The gearbox includes a locking device, which is electrically controlled and configured for preventing actuation of the engagement device associated to a predetermined forward gear ratio, said locking device being configured for being actuated above a threshold speed of the motor vehicle on which said gearbox is installed.

6 Claims, 14 Drawing Sheets

(51) Int. Cl.
  *F16H 61/16* (2006.01)
  *F16H 63/30* (2006.01)
(52) U.S. Cl.
  CPC ............ *F16H 2061/166* (2013.01); *F16H 2063/3076* (2013.01); *Y10T 74/19251* (2015.01)

(56) References Cited

U.S. PATENT DOCUMENTS

| | | | | |
|---|---|---|---|---|
| 5,970,815 | A  * | 10/1999 | Buerger | F16H 63/3408 74/473.24 |
| 2012/0297913 | A1 * | 11/2012 | Biallas | F16H 61/16 74/473.21 |
| 2015/0167716 | A1 * | 6/2015 | Hoffelder | F16H 59/70 324/207.11 |
| 2015/0204443 | A1 * | 7/2015 | Ryan | F16H 63/34 74/335 |

FOREIGN PATENT DOCUMENTS

| | | | | |
|---|---|---|---|---|
| DE | 3042920 | A1 | | 6/1982 |
| DE | 3742600 | A1 | | 7/1989 |
| DE | 102004046730 | A1 | * | 4/2006 ......... F16H 63/3023 |
| DE | 102004046730 | A1 | | 4/2006 |
| DE | 102008029264 | A1 | | 12/2009 |
| DE | 102008061894 | A1 | | 6/2010 |
| DE | 102012208630 | A1 | | 11/2012 |
| EP | 2025975 | A2 | | 2/2009 |
| WO | 2009/153119 | A2 | | 12/2009 |

OTHER PUBLICATIONS

Sep. 26, 2013 European Search Report in European Application No. 13162151.8.

* cited by examiner

GEARBOX FOR A MOTOR VEHICLE

CROSS REFERENCE

This Application is a continuation of U.S. Non-Provisional application Ser. No. 14/184,259 filed on Feb. 19, 2014, which claimed priority to European Patent Application No. 13162151.8 filed on Apr. 3, 2013, all of which is incorporated herein by reference.

FIELD OF THE INVENTION

The present invention relates to a gearbox for a motor vehicle, in particular of the type including a plurality of forward gear ratios and a reverse gear ratio, the gearbox further including: a control device configured for controlling the selection and the engagement of said forward gear ratios and said at least one reverse gear ratio; and a plurality of engagement devices that can be controlled by means of said control device for engaging forward gear ratios of the gearbox that are operatively associated to said devices.

PRIOR ART

FIGS. 1, 2, 2A, and 3 illustrate a manually operated gearbox of a known type proposed by the present Applicant, as well as some details of components and/or functional assemblies thereof.

The gearbox is designated as a whole by the reference number 1 and includes a casing 2 closed by a terminal plate 4. Moreover mounted on the casing 2 is a control device 6 configured for controlling selection and engagement of the forward gear ratios and of the reverse gear ratio of the gearbox 1.

With reference to FIGS. 1, 2, and 2A, the gearbox 1 includes a primary shaft PS rotatably mounted about an axis XP and two secondary shafts SS1, SS2 rotatably mounted about respective axes XS1 and XS2 parallel to one another and to the axis XP. Each shaft PS, SS1, SS2 carries a certain number of gear wheels that define the various forward gear ratios and the reverse gear ratio of the gearbox 1.

As may be noted, each forward gear ratio is defined by meshing of a pair of gear wheels, of which one is on the primary shaft, while the other is on one of the two secondary shafts, where moreover, in each pair, one of the two gear wheels is mounted idle, while the other is connected in rotation to the corresponding shaft.

As regards the reverse gear, in gearboxes of this type generally a third gear wheel is used mounted idle on a shaft parallel to the primary and secondary shafts (here two secondary shafts are present) and having the function of transmission and reversal of the motion.

In the case in point, a first forward gear ratio (first gear, designated by I) is defined by meshing of a gear wheel 8, which is on the primary shaft PS and is connected in rotation thereto, and a gear wheel 10 mounted idle on the first secondary shaft SS1.

A second forward gear ratio (second gear, designated by II) is defined by meshing of a gear wheel 12, which is on the primary shaft PS and is connected in rotation thereto, and a gear wheel 14 mounted idle on the secondary shaft SS1.

The gear wheels 10, 14 may alternatively be connected in rotation to the secondary shaft SS1 by means of an engagement device, in particular a synchronizer, designated by the reference number S1/2, which is displaced axially by means of a fork F1/2 slidably mounted on a shaft 16 and having a fork-like end designated by I/II.

A third forward gear ratio (third gear, designated by III) is defined by meshing of a gear wheel 18, which is on the primary shaft PS and is connected in rotation thereto, and a gear wheel 20 mounted idle on the secondary shaft SS2.

A fourth forward gear ratio (fourth gear, designated by IV) is defined by meshing of a gear wheel 22, which is on the primary shaft PS and is connected in rotation thereto, and a gear wheel 24 mounted idle on the secondary shaft SS2.

Each of the gear wheels 20, 24 may alternatively be connected in rotation to the secondary shaft SS2 by means of a second engagement device, in particular a synchronizer, displaced axially by means of a fork F3/4, slidably mounted on a shaft 26 and having, like the fork F1/2, a fork-like end, here designated by III/IV.

A fifth forward gear ratio (fifth gear, designated by V) is defined by a gear wheel 28 connected in rotation to the primary shaft PS and a second gear wheel 34 mounted idle on the secondary shaft SS1.

The gear wheels 30 and 34 may alternatively be connected in rotation to the secondary shaft SS1 by means of a third engagement device, in particular a synchronizer, designated by the reference number S5/6. The synchronizer S5/6 is displaced axially by means of a fork F5/6 having a fork-like end designated by V/VI, which is set parallel and in an aligned way with respect to the fork-like end I/II.

As may be noted, the transmission ratios of the various forward gears, intended as ratios between the angular velocity of the secondary shaft (SS1 or SS2) and the angular velocity of the primary shaft PS, increase proceeding from the first forward gear (I) towards the sixth (VI) forward gear. In this way, corresponding to the first forward gear is the first lowest transmission ratio, corresponding to the second forward gear is the second lowest transmission ratio, and so forth.

Finally, the reverse gear ratio of the gearbox 1 is defined by meshing of a gear wheel 36 connected in rotation to the primary shaft PS with a gear wheel 38 mounted freely rotatable on a shaft 40 and in turn meshing with a gear wheel 42 mounted idle on the secondary shaft SS2.

A synchronizer SRM is mounted on the secondary shaft SS2 and can be controlled by means of a fork SRM for connecting the gear wheel 42 in rotation to the shaft SS2. The fork FRM includes a fork-like end RM set parallel and aligned to the fork-like end III/IV.

Each of the two secondary shafts SS1 and SS2 moreover terminates with a pinion (not visible) that meshes with the crown wheel of a differential DIFF, rotatable about an axis XD.

As may be seen in FIG. 1, the fork-like ends of the forks F1/2, F3/4, F5/6, FRM are subdivided into two sets, arranged each on opposite sides with respect to the primary shaft PS: a first set includes the ensemble of the fork-like ends I/II and V/VI, whereas a second set includes the fork-like ends RM and III/IV. Finally, it should be noted that all the fork-like ends I/II, III/IV, V/VI and RM include a main groove A and a secondary groove B, the function of which will emerge more clearly in what follows.

With reference to FIGS. 2, 2A and 3, the control device 6 includes a case 44, which is connected to the casing 2, and rotatably mounted and axially mobile within which is a control shaft CS having a main (longitudinal) axis XCS.

The control shaft CS is connected in rotation to a first rocker 46, which can turn about the axis XCS and is configured for controlling a rotary motion of the control shaft CS.

The control shaft CS is moreover operatively connected to a second rocker 48, which can turn about an axis X48 orthogonal and incident with respect to the axis XCS and is configured for controlling an axial movement of the control shaft CS along the axis XCS.

The control shaft CS includes a first radial engagement finger 50 and a second radial engagement finger 52, which are provided in the proximity of axial ends of the case 44.

In particular, the first and second radial engagement fingers 50, 52 are obtained on corresponding engagement bushings 54, 56 fitted on and connected in rotation to the control shaft CS. Moreover fitted on the engagement bushing 54 is a lamellar element consisting in a generally U-shaped thin plate 58, which includes a saddleback with undulated profile basically comprising three troughs associated to a neutral position (central trough V1) of the engagement finger 50, to a first engagement position (first lateral trough V2) of the finger 50, and to a second engagement position (second lateral trough V3) of the finger 50. Maintenance of one or other position is ensured by means of a stud with spring-mounted ball, where the ball engages in each of the depressions of the thin plate 58, thus fixing the angular position of the control shaft CS. For a visual picture of this description, reference may momentarily be made to FIG. 8 in so far as the viewpoint of FIG. 3 does not enable viewing of the aforementioned details.

Since the finger 52 is moreover radially aligned with the finger 50 and rigidly rotatable therewith, the positions of the finger 50 correspond to the same operating positions of the finger 52; consequently, the thin plate 58 fixes the position of both of the engagement fingers.

Provided, instead, in a position diametrally opposite with respect to the finger 52 on the engagement bushing 56, is a pin (not visible in FIG. 3), which is mobile within a selection grid 60, which is made as set of grooves in a second thin plate 62 fixed to the case 44. The selection grid 60 reproduces in top plan view the sequence of the planes of engagement of the various forward gear ratios and reverse gear ratio of the gearbox 1.

The control device 6 is completed by a sliding blade 64, which is configured for preventing simultaneous engagement of more than one forward gear ratios, ensuring that only the ratios belonging to the engagement plane selected can be engaged.

For this purpose, the sliding blade 64 includes two grooves 66, 68 set in positions corresponding the engagement fingers 50, 52 and set apart by full-height stretches of wall. The sliding blade 64 translates rigidly with the control shaft CS and is positioned within the case 44 so that, when the latter is coupled to the casing 2, it comes to engage within the sequence of the grooves B (all arranged aligned to one another) of the fork-like ends I/II, III/IV, V/VI and RM. The control shaft CS is instead positioned so that the engagement fingers 50, 52 correspond to the grooves A of the fork-like ends I/II, III/IV, V/VI and RM, so that they can engage therein, when required. In particular, the finger 50 is assigned to the fork-like ends I/II and V/VI, while the finger 52 is assigned to the fork-like ends III/IV and RM. For each engagement finger, FIG. 3 shows the association referred to above by means of a false schematic top plan view of the fork-like ends and dashed-and-dotted lines that identify the selection planes. In each of the two schemes, in the case where the selection plane comprises a fork-like end that can be actuated by means of the corresponding engagement finger, the reference used is that of the fork-like end itself; in the case where, instead, the selection plane does not comprise any fork-like end that can be actuated with the corresponding engagement finger, the reference used is in brackets and corresponds to the ratios that in any case belong to the engagement plane. It should be noted that the control device 6 is designed in such a way that, when one engagement finger 50 or 52 is engaged in a fork-like end, the other finger is in a position where there is no fork-like end: for said purpose, the fork-like ends I/II and V/VI, as likewise the fork-like ends III/IV and RM are axially spaced apart along the axis CS by an amount at least equal to the thickness (axial dimension along the axis CS) of the fingers 50, 52.

The fork-like ends VII, III/IV, V/VI and RM can be moved axially only when the respective grooves B are free from the blade 64, which happens only when one of the engagement fingers 50, 52 is brought to engage in one of the grooves A: only in positions corresponding to the engagement fingers 50, 52 does the blade 64 have the grooves 66, 68, which disengage the blade 64 from the groove B of the selected fork-like end, in so far as the grooves 66, 68 define free spaces within which axial translation of the fork-like ends may occur.

As is known, during operation, the gearbox 1 is operated manually by the driver of the vehicle on which it is installed by axial displacement of the control shaft CS through the rocker 48—which makes it possible to carry out the gear-selection manoeuvre—and the control shaft is moreover turned about the axis XCS through the rocker 46 so as to bring about, once the selection manoeuvre is through, engagement of one or the other gear within an engagement plane (the only exception is the reverse gear, which in the case of the gearbox 1 is in an engagement plane of its own as single gear). The manoeuvre for selecting a given engagement plane consists in bringing one of the two engagement fingers (50 for the gears I, II and V, VI; 52 for the gears III, IV and RM) into a position corresponding to the fork-like end of the fork that actuates the corresponding engagement device (S1/2 and S5/6 for the finger 50, S3/4 and SRM for the finger 52).

The inventors have noted that manually operated gearboxes can easily be subject to irreparable damage (as likewise the engine of the vehicle) as a consequence of wrong manoeuvres of selection and engagement of the gears, due to a momentary distraction or to inadequate experience of the driver. In the case in point, the most serious problems may arise in the downshift manoeuvres, in which engagement of a gear ratio that is too low can result in the destruction of the transmission and of the engine.

As example, the inventors have noted that a downshift manoeuvre initiated at a speed higher than 80 km/h and having as result the erroneous engagement of the first or second forward gear ratios instead, for example, of the fourth or third forward gear ratios, resulted in the immediate destruction of the clutch due to centrifuging of the friction linings, as well as in irreparable damage to the internal-combustion engine.

In fact, whereas the sliding blade 64 prevents simultaneous engagement of two forward gear ratios, it cannot prevent engagement of any forward gear ratio when correctly selected, which includes also the case in point in which the movements of selection and engagement have been precise but have involved a forward gear ratio that is absolutely inadequate for the advancement speed of the vehicle.

OBJECT OF THE INVENTION

The object of the invention is to overcome the drawbacks described previously.

In particular, the object of the invention is to provide a gearbox for a motor vehicle in which a preventive action in regard to engagement of forward gear ratios that would be such as to result in damage to the structural integrity of the engine and of the transmission of the vehicle is performed.

SUMMARY OF THE INVENTION

The object of the invention is achieved by a gearbox for motor vehicles having the features forming the subject of one or more of the ensuing claims, which form an integral part of the technical teaching provided herein in relation to the invention.

In particular, the object of the invention is achieved by a gearbox for motor vehicles having all the features mentioned at the beginning of the present description and further characterized in that it includes an electrically controlled locking device configured for preventing operation of the engagement device associated to a predetermined forward gear ratio, wherein said engagement device is configured for being operated above a certain threshold speed of the motor vehicle on which the gearbox is installed.

BRIEF DESCRIPTION OF THE FIGURES

The invention will now be described with reference to the annexed figures, which are provided purely by way of non-limiting example and wherein.

DETAILED DESCRIPTION OF EMBODIMENTS OF THE INVENTION

Figure 4:
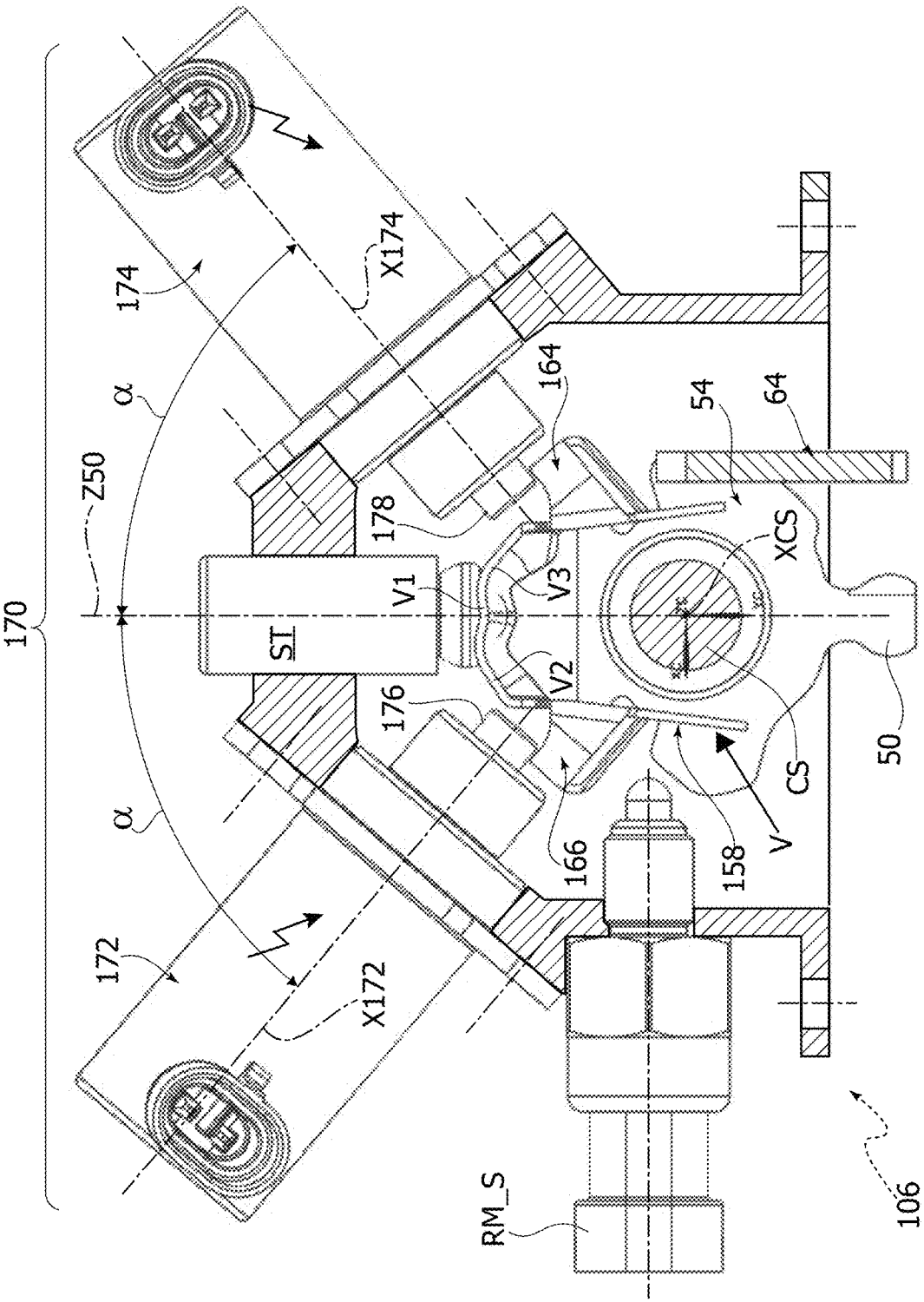
FIG. 4 is a cross-sectional view according to the trace IV-IV of FIG. 3 but referred to a control device of a gearbox according to a first embodiment of the invention.

With reference to FIG. 4, the reference number 106 identifies a control device for a gearbox according to a first embodiment of the invention. The components identical to the ones described previously are designated by the same reference numbers.

The control device 106 includes an electrically controlled locking device designated by the reference number 170. The locking device 170 includes a first electromagnetic actuator 172 and a second electromagnetic actuator 174, each including an electromagnet configured for displacing a corresponding pin 176, 178 between an extracted position, visible in FIG. 4, and a retracted position. The pins 176, 178 are normally in the retracted position.

The actuators 172, 174 have axes X172, X174 to which the pins 176, 178 are coaxial.

Likewise forming part of the locking device 170 is a thin plate 158, which is configured substantially as a variant of the thin plate 58 described previously. The thin plate 158 is fitted on the engagement bushing 54 so as to translate rigidly therewith. It is moreover connected in rotation to the bushing 54.

Figure 6:
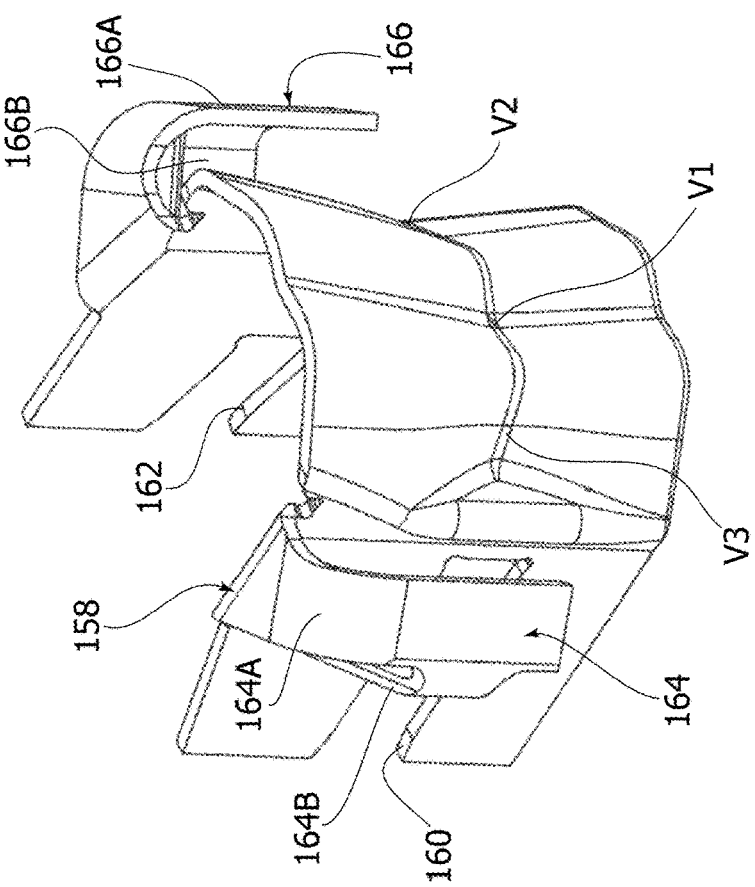
FIGS. 5 and 6 are opposite perspective views of a component indicated by the arrow V in FIG. 4.
Figure 5:
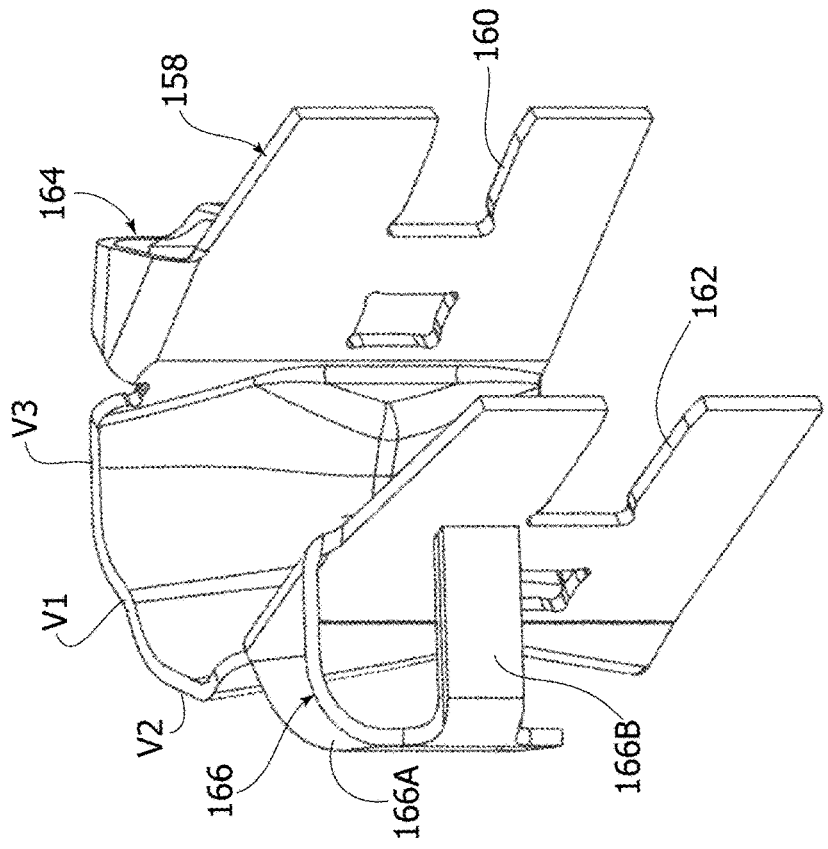

With the aid of FIGS. 5 and 6, the thin plate 158 is substantially a U-shaped lamellar element and includes two side flaps on which a first groove 160 and a second groove 162 and a first lateral appendage 164 and a second lateral appendage 166 are provided. The appendages extend beyond the side flaps of the thin plate 158. Each appendage 164, 166 is obtained by double bending of metal projections, which—if developed in the plane—are substantially L-shaped or else T-shaped and are integral with the side flaps of the thin plate 158.

In this way, on each appendage a first stretch designated by the references 164A, 166A, respectively, is defined, which is substantially shaped to form an L by bending back towards the casing of the thin plate each of the metal projections so as to confer to each of the first stretches an orientation substantially aligned to the surface of the thin plate itself.

Each appendage moreover includes second stretches 164B, 166B substantially orthogonal to the stretches 166A, 164A and incident with respect to the side flaps of the thin plate 158 so as to provide substantially two supports.

In this way, with reference to FIGS. 5 and 6, the first stretches 164A, 166A substantially define contrast surfaces for the pins 176, 178, whilst the stretches 164B, 166B provide a further support for the appendages 164, 166 during interaction with the pins 176, 178.

With reference once again to FIG. 4, it should be noted that each of the actuators 172, 174 is fixed to the case 106 (which, preferentially, may be shaped so as to present a pair of fixing flanges for the aforesaid actuators) so that the longitudinal axes X172, X174 of the actuators 172, 174 and of the pins 176, 178 are arranged with an orientation substantially transverse with respect to the axis XCS and to the control shaft. The orientation of the axes X172, X174 is moreover symmetrical with respect to an axis Z50 orthogonal to the axis XCS and passing through a median plane of the engagement finger 50.

The reference α denotes the angle comprised between each of the axes X172, X174 and the axis Z50 and is preferably the same for the two actuators.

Once again with reference to FIG. 4, it should be noted how the choice of the angle a affects the geometry of the appendages 164, 166: since the thin plate 158 is fitted on the engagement bushing 54 by means of the grooves 160, 162, also this is set symmetrically with respect to the axis Z50, so that the inclination with respect to the axis Z50 of each of the stretches 166A, 164A must be equal to α.

Moreover visible in FIG. 4 is the stud ST described previously, and also visible are the troughs V1, V2, V3 on the back of the thin plate 158 (see also FIG. 6).

Operation of the device 106 is described in what follows.

Figure 1:
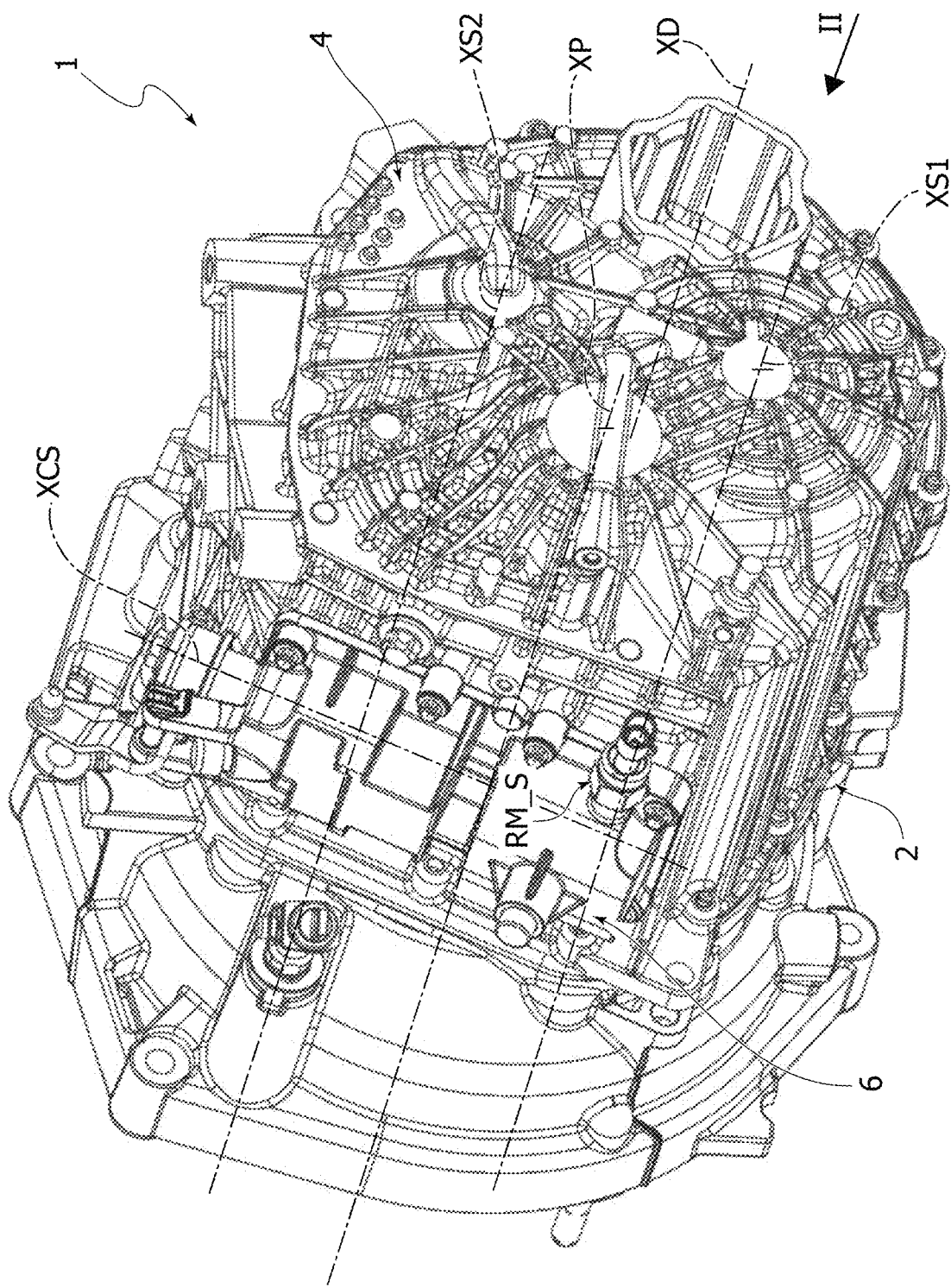
FIG. 1, described previously, is an external perspective view of a gearbox of a known type.
Figure 2:
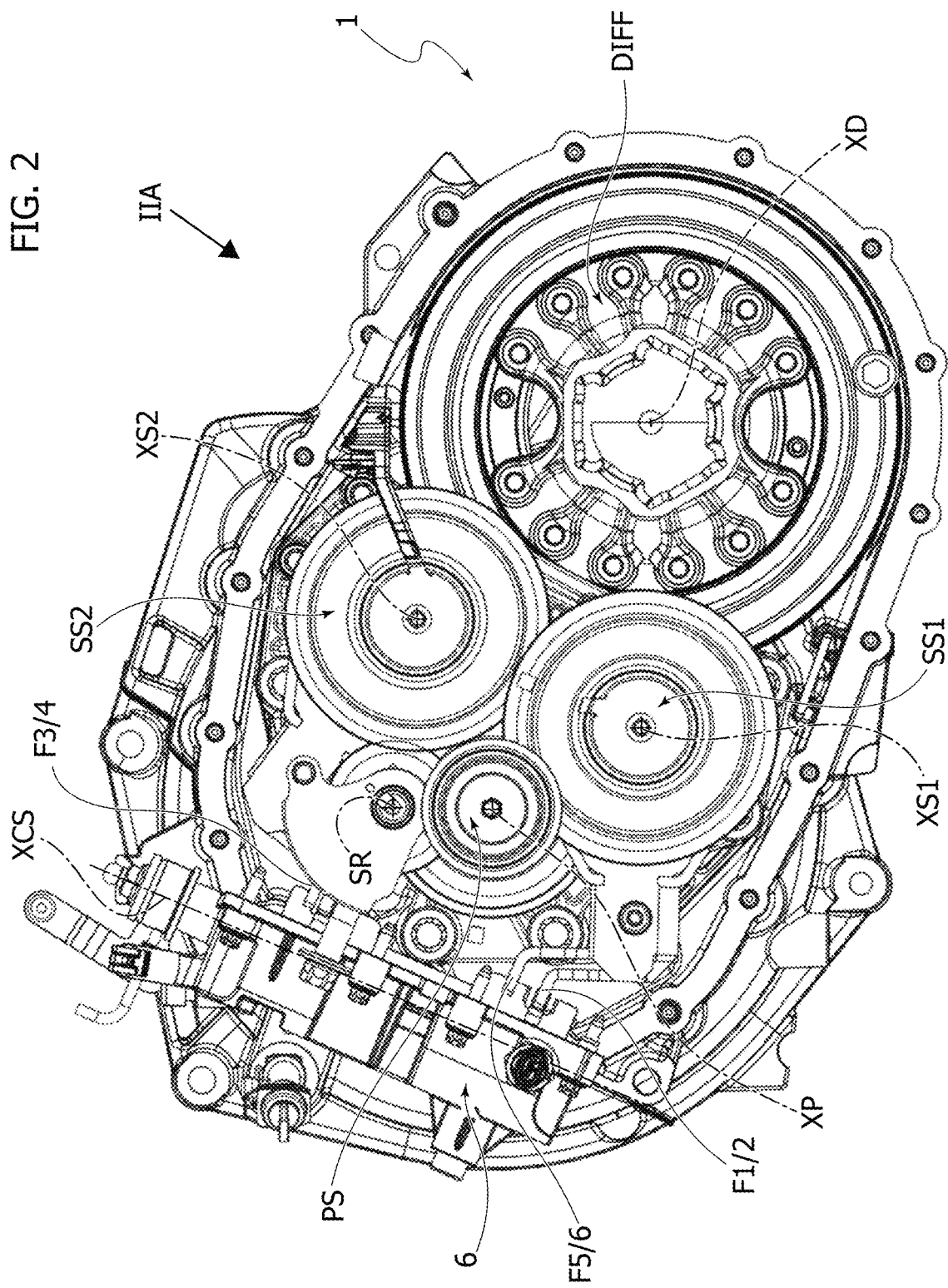
FIG. 2, described previously, is a front view according to the arrow II of FIG. 1 with some components removed for greater clarity.
Figure 2A:
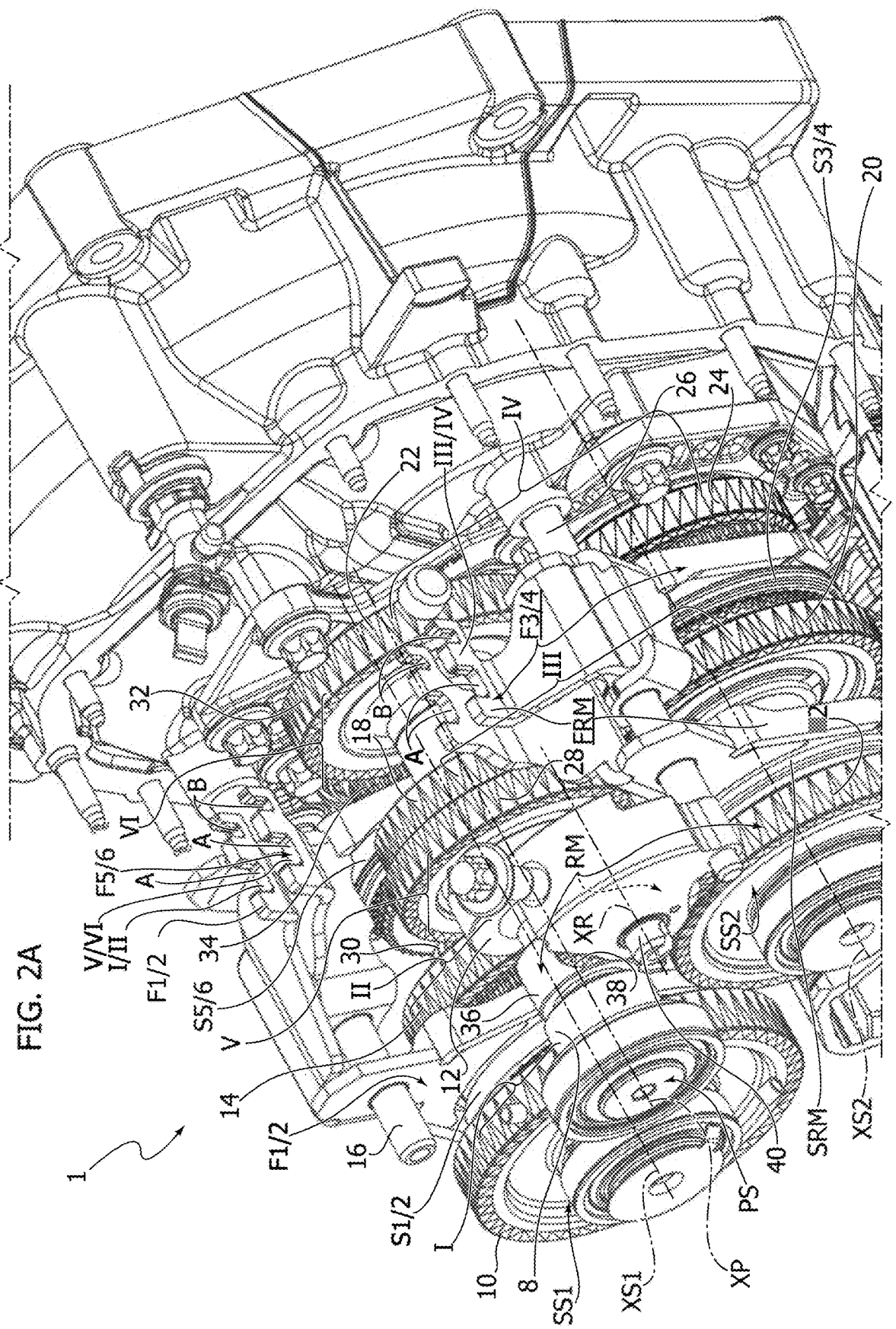
FIG. 2A is a perspective view according to the arrow IIA of FIG. 2 with further components removed for clarity so as to show the internal structure of the gearbox.
Figure 3:
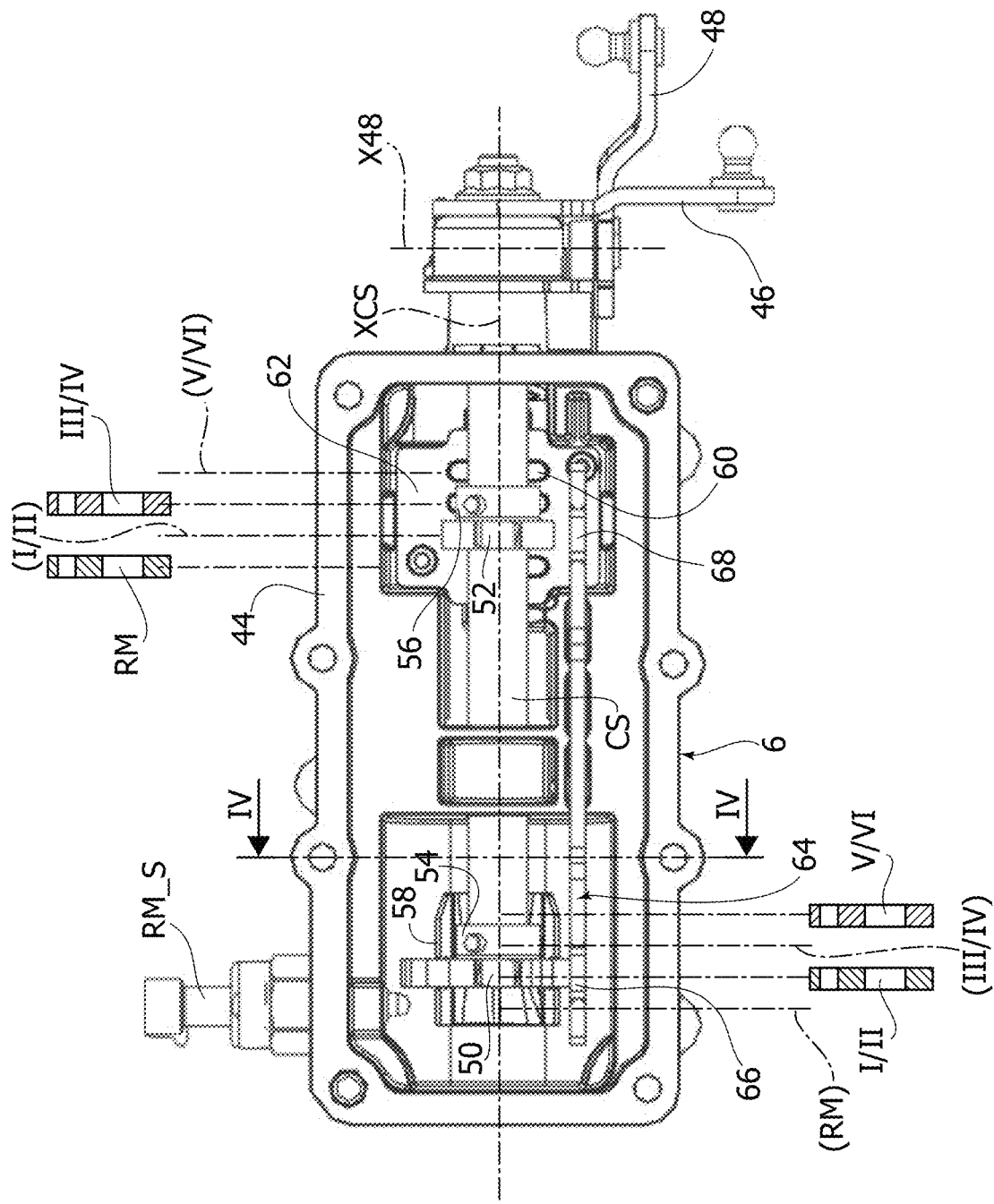
FIG. 3, described previously, is a view from beneath of a control device of the gearbox of the previous figures.

With reference to FIG. 4 and with the aid moreover of FIG. 3, when the driver controls an axial movement of the control shaft CS that brings the finger 50 into the engagement plane of the first and second gears (i.e., more in general, when the control shaft CS is in a position that makes the selection of the engagement plane of the first and second forward gears), which corresponds exactly to the condition illustrated in FIG. 3, also the thin plate 158 that translates rigidly with the engagement bushing 54 reaches an axial position such that the appendages 164, 166 are in positions corresponding to the actuators 172, 174.'

If the vehicle is travelling at a speed higher than a threshold speed—which can be calculated for the first and second gears (but also for other forward gears) taking into account the global ratio of transmission of the kinematic chain that goes from the gearbox 1 up to the drive wheels of the vehicle, passing of course through the differential DIFF—an electronic control unit sends an electrical signal to one or both of the actuators 172, 174 so as to control exit of the respective pins 176, 178, which are normally in the retracted position. This is because, in order to guarantee engagement of the gears in a way altogether identical to what happens on a control device of a known type, such as the one illustrated in FIG. 3, the pins 176, 178 must normally be in the retracted position.

The aforesaid electronic control unit may be either an electronic control unit of the internal-combustion engine or a separate electronic control unit.

With reference to FIG. 4, when the pins 176, 178 are in the corresponding extracted position, they come into contact with the appendages 166, 164, in particular in a region of space comprised between them and the saddle back of the thin plate 158, and in effect prevents the possibility of rotation of the control shaft CS.

Since the thin plate 158 is connected in rotation to the engagement bushing 54, if the rotation about the axis XCS of the thin plate 158 is locked in one or both of the directions of rotation by the pins 176, 178, also the rotation of the bushing 54 and of the control shaft CS is likewise locked. The same applies, of course, also to the bushing 56.

In this way, it is possible to prevent actuation of the synchronizer S1/2 and hence engagement of the first and second gears.

It is also possible to envisage a control strategy that enables locking of rotation of the engagement finger 50 only in the direction that corresponds to engagement of the first forward gear, to be carried out, for example, in the case where the speed of the vehicle is higher than a safety threshold for engagement of the first gear but is lower than a safety threshold speed for engagement of the second gear.

In general, to each forward gear ratio engagement of which is prevented by the locking device 170 there may be associated (and preferentially is associated) a corresponding and distinct threshold speed of the motor vehicle. For example, for the first gear ratio (I) the threshold speed may be chosen equal to 50 km/h, whilst for the second gear ratio (II) the threshold speed may be chosen equal to 80 km/h. In this way, above 80 km/h both of the actuators 172, 174 are activated by the electronic control unit for controlling exit of both of the pins 176, 178, whereas below 80 km/h only the actuator the pin of which locks engagement of the first gear, here the actuator 172 with the pin 176, is activated. If the vehicle has to slow down gradually from speeds higher than 80 km/h, then it is possible to maintain actuation of just the actuator 172, the signal to the actuator 174 ceasing.

Control strategies that envisage in any case locking of both directions of rotation for engagement of the first and second gears I and II are in any case more conservative, and safer.

Simultaneously to entry into action of the actuators 172, 174 it is possible to envisage turning-on of a warning light and/or an acoustic warning that warns the driver of the hazard.

Figure 7:
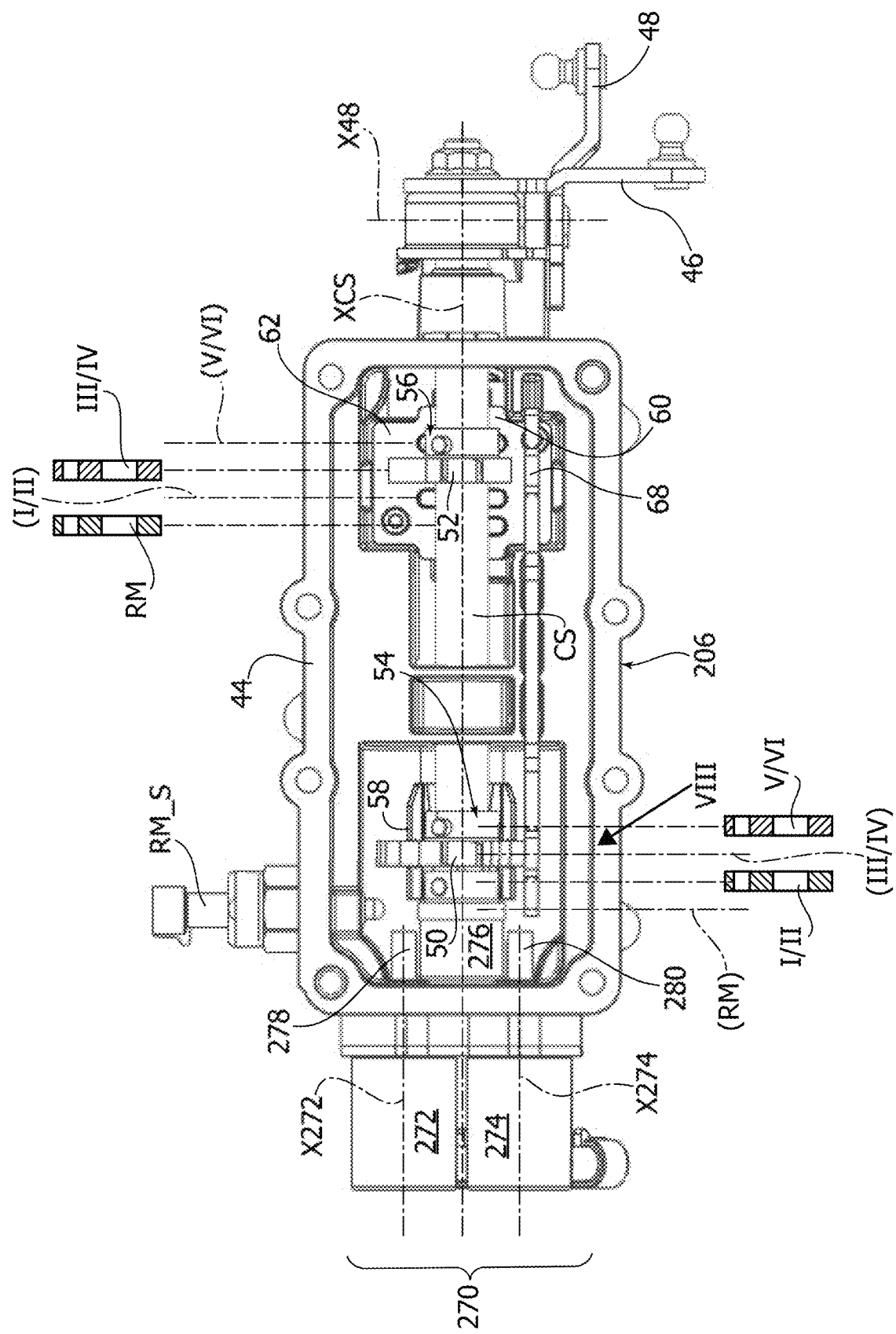
FIG. 7 is a view corresponding to that of FIG. 3 but illustrating a control device for a gearbox according to a second embodiment of the invention.
Figure 8:
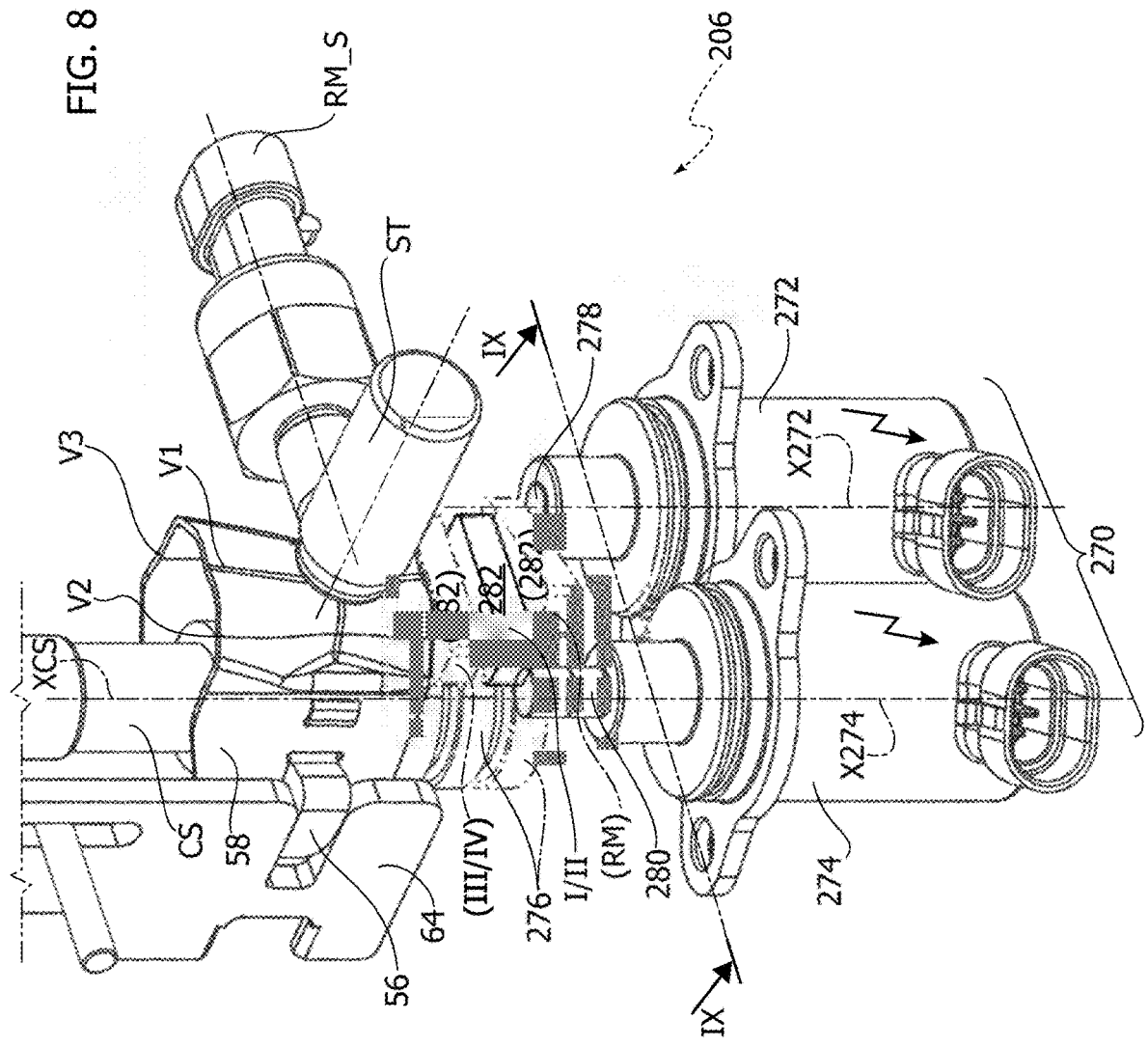
FIG. 8 is a perspective view, with some components removed for clarity, of a portion indicated by the arrow VIII in FIG. 7.
Figure 9:
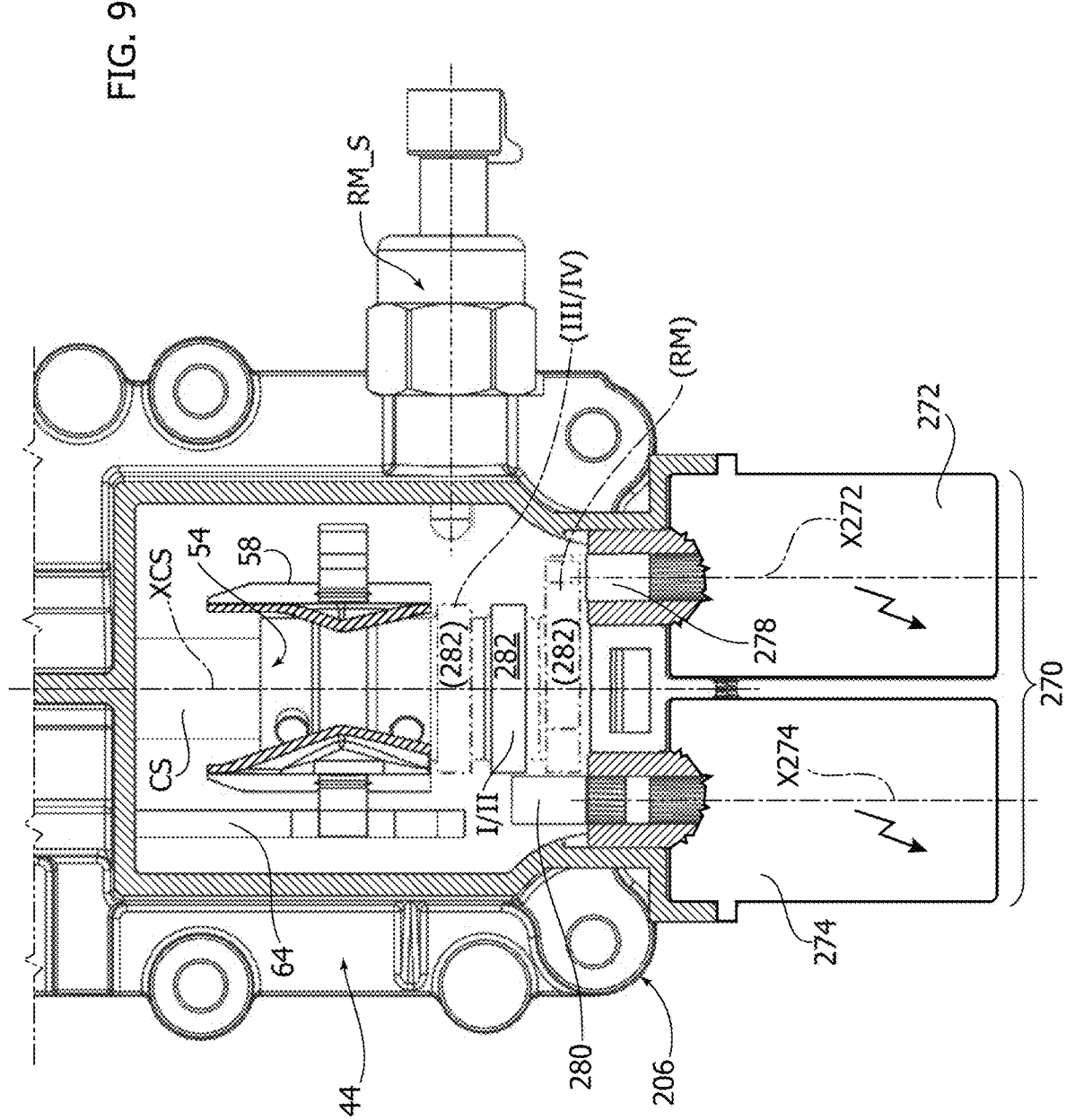
FIG. 9 is a partial cross-sectional view of the control device of FIG. 7 according to the trace IX-IX of FIG. 8.

Reference will now be made to FIGS. 7 to 9, which illustrate a control device 206 configured for installation on a gearbox according to a second embodiment of the invention. All the components identical to the ones described previously are designated by the same reference numbers already used.

As compared to the control device 6, the control device 206 differs as regards the presence of a locking device 270 set axially at one end of the case 44 opposite to the one where the rockers 46, 48 are hinged.

The locking device 270 includes a first actuator 272 and a second actuator 274, and a further bushing 276 positioned at one end of the control shaft CS substantially adjacent to the engagement bushing 54.

It should be noted that also visible in FIG. 7 is the thin plate 58, which is identical to that of the control device 6. Each of the actuators 272, 274 is of an electromagnetic type and is configured for movement of a respective pin 278, 280 in an axial direction between an extracted position and a retracted position.

The actuators 272, 274 have longitudinal axes X272, X274 that are parallel to one another and to the axis XCS. Since the pins 278, 280 share the axes X272, X274, they too consequently have their axes parallel to the axis XCS.

With reference to FIG. 8, the bushing 276 includes a radial tab 282 set in a position diametrally opposite with respect to the radial engagement finger 50. The bushing 276 is connected in rotation to the control shaft CS and rigidly translates in an axial direction therewith. As may be seen from FIG. 8, the width of the radial tab 282 is sized so as to be substantially equal (but for functional tolerances) to the difference between the centre-to-centre distance of the pins 278, 280 and the diameter of one of them in such a way as to set itself exactly between the lateral surfaces of the pins themselves.

Operation of the control device 206 is described in what follows.

With reference to FIGS. 7 to 9, when the driver controls an axial movement of the control shaft CS that brings the finger 50 into a position corresponding to the engagement plane of the first and second gears (i.e., more in general, when the control shaft CS is in a position that makes the selection of the engagement plane of the first and second forward gears), a position that may be derived from FIG. 7 via the schematic representation of the engagement planes and of the fork-like ends (similar to that of FIG. 3), the bushing 276 translates axially with the bushing 54 and moves into a position represented by a solid line in FIGS. 8 and 9.

For this purpose, it should be noted that FIGS. 8 and 9 illustrate the aforesaid position with a solid line and designate it by the reference number without brackets, whereas the further operating positions are represented by a dashed and double-dotted line and are designated by the reference number in brackets, in accordance with the notation already used previously.

When the speed of the vehicle on which the gearbox 1 comprising the device 206 installed exceeds a threshold value deemed safe for engagement of the first and/or second forward gears, an electronic control unit sends an electrical signal to the actuators 272, 274 for controlling exit of the pins 278, 280 (one or both of them, depending upon the conditions already mentioned previously), which are normally in the retracted position for the reasons already explained.

Exit of the pins 278, 280 hence brings them into positions in which they are on opposite sides with respect to the radial tab 282 and in contact therewith (with slight play, to make up for the kinematic chain of tolerances). The tab 282 is thus prevented from turning in one direction or the other. This also prevents rotation of the control shaft CS and consequently actuation of the synchronizer S1/2, thus making it impossible to complete the manoeuvre of engagement of the first or second gears.

Sending of the electrical actuation signal to the actuators 272, 274 may be accompanied, as already mentioned, by turning-on of a warning light and/or an acoustic warning to warn the driver of the condition of danger.

It should moreover be noted, with reference to FIGS. 8 and 9, that the locking device 270 is also an extremely valid aid, just like the locking device 170, to prevent accidental engagement of the reverse gear in the case where the vehicle is advancing at any speed other than zero.

In fact, with reference to the position represented by a dashed and double-dotted line and associated to the reference RM in brackets, the bushing 276 can assume an extreme position, which is further translated in an axial direction with respect to the one corresponding to selection of the engagement plane of the first and second gears when the control shaft CS is shifted axially to achieve engagement of the engagement finger 52 within the fork-like end RM, as may be seen in FIG. 7. In this case, it is possible to activate the actuators 272, 274 for controlling exit of the pins when the following two conditions arise:

speed of the vehicle other than 0 km/h; and
activation of a reverse-gear-engagement sensor RM_S, visible on the case 44 in FIG. 9, which is normally used for turning-on of the reverse lights.

If the actuators 272, 274 are equipped with an electromagnet of a proportional type, it would even be possible to send a first voltage signal, with a first amplitude, in concomitance with a reverse-gear selection manoeuvre so as to control exit of the pins 278, 280 by an amount less than that of the corresponding maximum travel (which would instead be controlled by a second voltage signal, with a second amplitude greater than the first amplitude), which is instead necessary for preventing engagement of the first and second gears.

Figure 10:
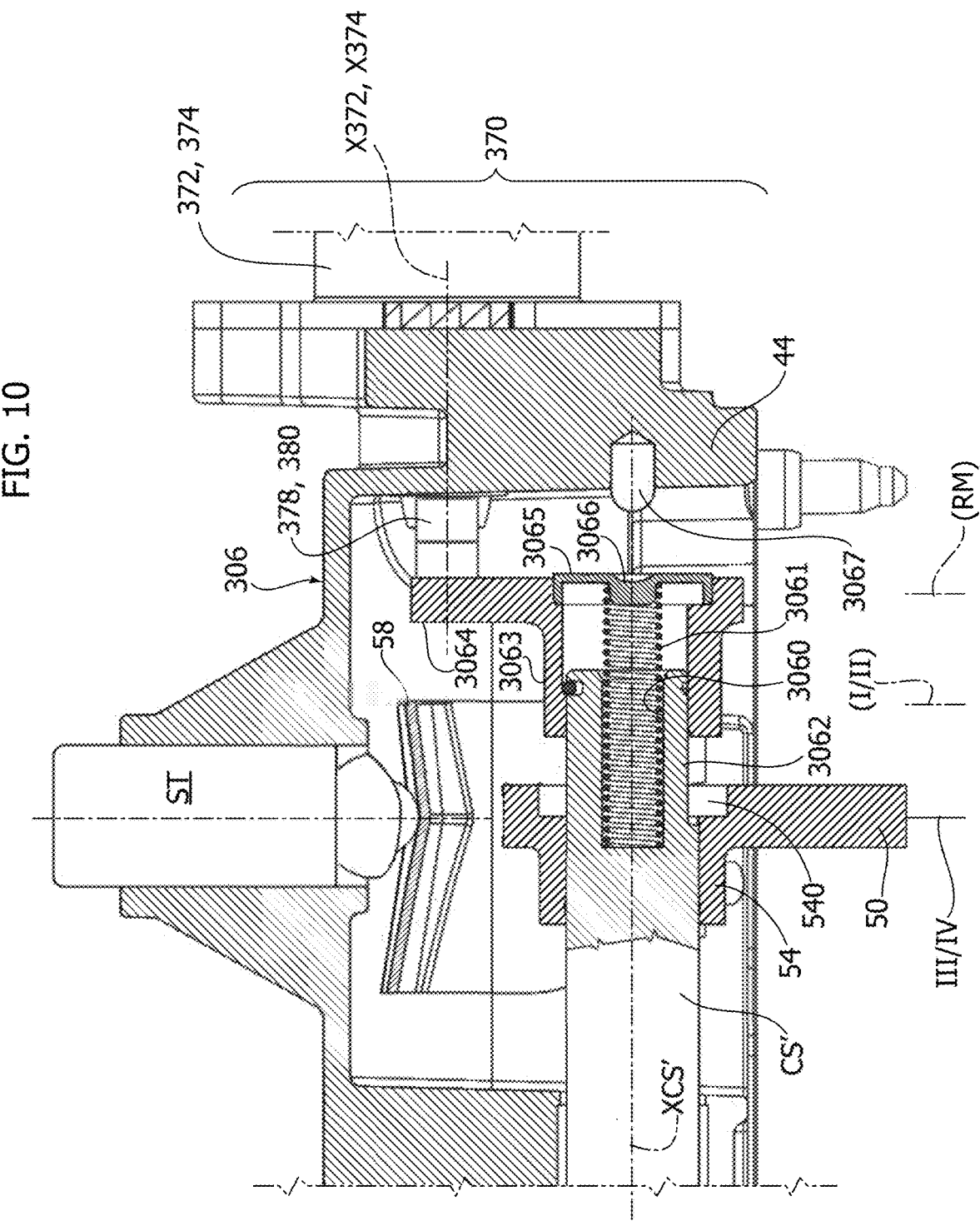
FIG. 10 is a cross-sectional view of a portion of control device of a gearbox according to a third embodiment of the invention.

With reference to FIG. 10, a third embodiment of the control device 206 is designated by the reference number 306. All the components identical to the ones described previously are designated by the same reference numbers already used.

The control device 306 differs from the devices 6, 106 and 206 as regards the conformation of the control shaft CS, which in this case is designated by the reference CS' (the main axis is designated by XCS'). The control shaft CS' is identical to the control shaft CS except at the end located in a position corresponding to the engagement bushing 52. At this end there is in fact provided a blind axial hole 3060, housed within which is an elastic element 3061—preferentially a helical spring of large axial development—moreover comprising a flattened portion 3062.

Fitted on the flattened portion 3062, and consequently fixed in rotation with respect to the control shaft CS', is a hollow bushing 3063 having a radial tab 3064 substantially similar to the radial tab 282.

The bushing 3063 is closed at one end by a cap 3065, forced within the cavity of the bushing 3064 so as to be permanently connected thereto and having a projection on which the spring 3061 fits. On the opposite side, the cap 3065 is moreover provided with a spherical recess 3066 configured for shape fit with a grubscrew 3067 with spherical head inserted and blocked within the case 44.

The control device 306 is completed with a locking device 370 similar to the locking device 270, hence including two electromagnetic actuators 372, 374 configured for moving respective pins 378, 380 between an extracted position and a retracted position. The pins 378, 380 are normally in the retracted position. The actuators 372, 374 have axes X372, X374 that are parallel to one another and to the axis XCS. Since the pins 378, 380 share the axes X372, X374, they also have their axis parallel to the axis XCS'.

The difference with respect to the locking device 270 lies in the fact that, given the same dimensions of the actuators, the maximum travel of the pins may be more contained, for reasons that will be described in detail shortly.

Operation of the control device 306 is described in what follows.

With reference to FIG. 10, represented at the foot of the illustration are three vertical lines corresponding to the position of the engagement finger 50 when the control shaft CS' is moved into the planes of engagement of the third gear (III) and fourth gear (IV), the first gear (I) and second gear (II), and the reverse gear. The position illustrated, as emerges also from the notation used and in conformance with the previous one, is the one corresponding to the engagement plane of the third and fourth gears.

The ensemble of the additional elements at the end of the shaft CS' has been designed by the inventors so as to reduce the travel of the pins displaced by the actuators 372, 374. The purpose of this is to prevent ultimately that, in the case of applications where the control device has dimensions such as to require a very long travel of the pins, there is run the risk of permanent distortion and deformation of the pins (with possible damage to the actuators themselves) should the driver be particularly insistent in carrying through the manoeuvre of engagement of the first and second gears, notwithstanding the preventive action of the locking device.

Thanks to the control device 306, it is possible, so to speak, to "anticipate" entry into action of the locking device 370 with respect to what happens in the control device 206.

In greater detail, when the driver controls an axial displacement of the control shaft CS' that brings the finger 50 into a position corresponding to the engagement plane of the first and second gears (i.e., more in general, when the control shaft CS is in a position that makes the selection of the engagement plane of the first and second forward gears), the bushing 3063 translates rigidly in an axial direction with the control shaft CS' without varying its axial distance with respect to the bushing 54, which is maintained via the elastic element 3061.

The axial distance between the finger 50 and the radial tab 3064 is moreover chosen in such a way that, when the finger 50 is in a position corresponding to the engagement plane of the first and second gears, the cap 3065 comes to bear, with the recess 3066, upon the head of the grubscrew 3067, which functions as contrast element.

The person skilled in the branch will thus have no difficulty in appreciating that in this position the radial tab 3064 is extremely close (the contact proper is prevented by the grubscrew 3067) to the wall of the case 44, where the pins 378, 380 are situated, which consequently can lock rotation of the control shaft CS (thus preventing actuation of the synchronizer S1/2 and hence engagement of the first and/or second gears) with a reduced axial travel.

Even though engagement of the reverse gear is an operation obtained via the other engagement finger 52, it involves in any case a further axial movement of the control shaft CS and of the finger 50, which will hence occupy the position designated by the reference RM in brackets and associated to a dashed and dotted line.

The bushing 3063 remains bearing upon the grubscrew 3067, but at this point it is the control shaft CS' that slides axially within the bushing 3063 creating an axial compression of the spring 3061, which reduces up to vanishing of the axial distance between the bushings 3063 and 54.

It should be noted that in one embodiment, such as that illustrated in FIG. 10, it is possible to envisage a recess 540 with a diameter equal to the external diameter of the bushing 3063 so that there is also a partial interpenetration of the two bushings. This of course is linked to the specific dimensions of the control device 306, which are in turn conditioned by the geometry of the gearbox. In other embodiments, it is possible simply to envisage either an axial contact or a contactless approach between the two bushings 3063 and 54.

The difference with respect to the solution forming the subject of FIGS. 7 to 9 hence lies in the fact that there is allowed a relative axial movement between the element that physically determines locking of rotation of the control shaft CS' (i.e., the bushing 3063) and the control shaft CS' itself.

It should be noted that, with the arrangement of the fork-like ends illustrated herein, it is not possible to achieve the above result with a rigid solution of the type illustrated in FIGS. 7 to 9 in so far as, if the bushing 276 is installed in a position closer to the wall of the case (as occurs in the control device 306), the travel required of the pins 278, 280 would indeed be reduced, but at the cost of the impossibility of engaging the reverse gear.

In fact, the further axial travel of the control shaft CS necessary for bringing the engagement finger 52 into the fork-like end RM could not be covered in so far as the bushing 276 would be already bearing upon the wall of the case 44, thus preventing any further axial movement of the control shaft.

Figure 11:
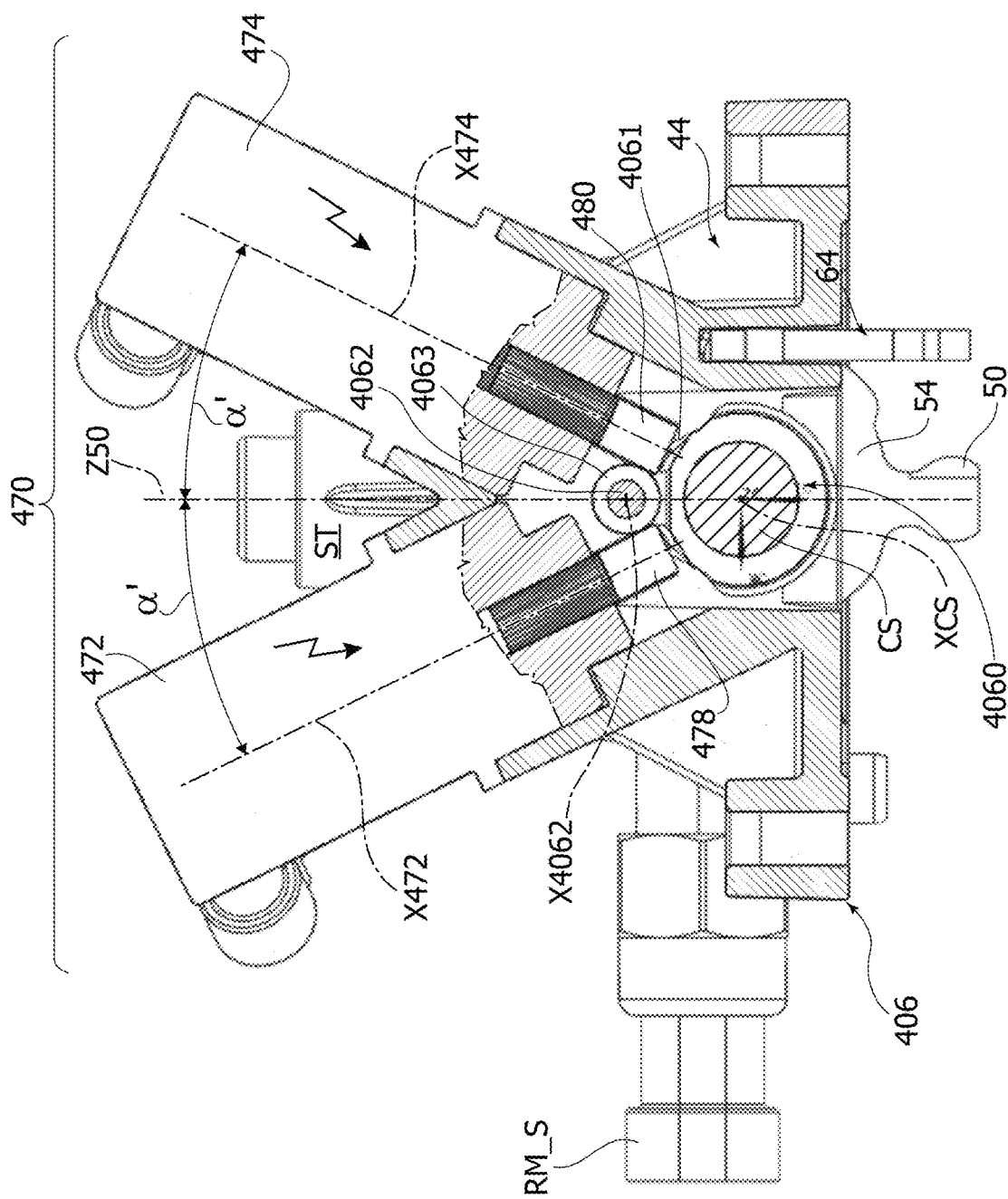
FIG. 11 is a cross-sectional view according to the trace XI-XI of FIG. 12 and referred to a fourth embodiment of the invention.
Figure 12:
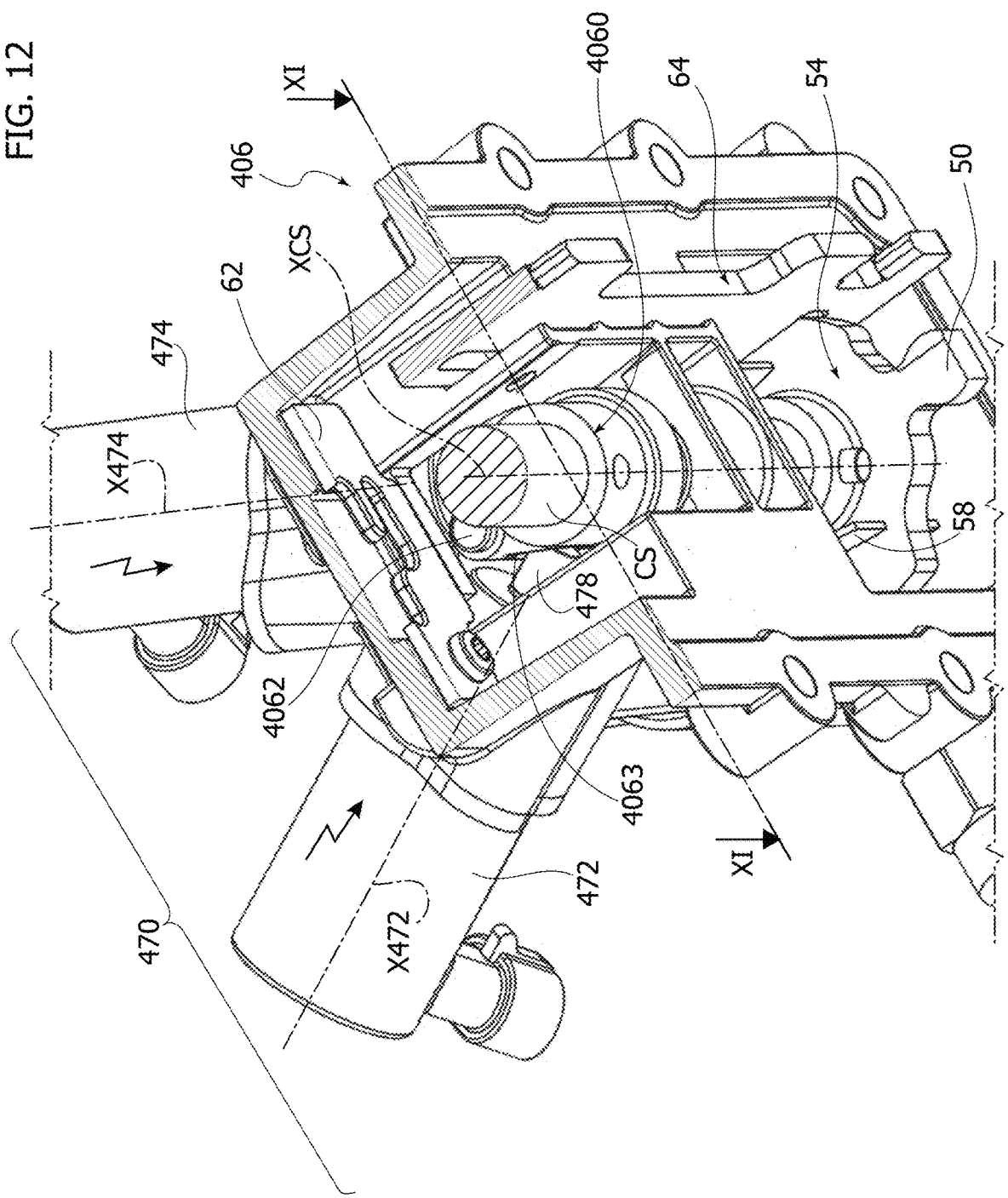
FIG. 12 is a cross-sectional perspective view of a control device of a gearbox according to the fourth embodiment of the invention.

FIGS. 11 and 12 illustrate a fourth embodiment of the invention. The control device is designated in these figures by the reference number 406 and all the components identical to the ones described previously are designated by the same reference numbers.

The control device 406 includes a locking device 470, in turn including a first electromagnetic actuator 472 and a second electromagnetic actuator 474. Each actuator 472, 472 includes an electromagnet configured for movement of a corresponding pin 478, 480 between an extracted position and a retracted position. The pins 478, 480 are normally in the retracted position.

The actuators 472, 474 have axes X472, X474 to which the pins 478, 480 are coaxial.

It should be noted that the actuators 472, 474 are arranged in a way similar to the actuators 172, 174 of the device 170: each of the actuators 472, 474 is fixed to the case 44 (which preferentially may be shaped so as to present a pair of fastening flanges for the aforesaid actuators) so that the longitudinal axes X472, X474 of the actuators 472, 474 and of the pins 478 and 480 are arranged with orientation substantially transverse with respect to the axis XCS and to the control shaft. The orientation of the axes X472, X474 is moreover symmetrical with respect to the axis Z50.

The reference α' denotes the angle comprised between each of the axes X472, X474 and the axis Z50 and is preferably the same for the two actuators. The angle α' may be greater than, smaller than, or identical to the angle α, depending upon the layout of the control device and of the gearbox.

Forming part of the locking device 470 is also a bushing 4060 fitted on the control shaft CS in a position intermediate between the bushings 54, 56 and connected in rotation to the shaft CS itself.

The bushing 4060 is substantially drop-shaped; i.e., it includes a circular hub and a single or double bracket designated by the reference number 4061, which bears a pin 4062 on which a roller 4063 is mounted in a freely rotatable way. As may be seen from FIG. 11, the diameter of the roller 4063 is chosen in such a way that, when the pins 478, 480 are in the completely extracted position with respect to the actuators 472, 474, it can come to occupy a position between the pins themselves (at the most it could be tangential thereto).

Operation of the control device 406 is described in what follows.

When the driver of the vehicle on which the gearbox 1 is installed controls an axial advance of the control shaft CS such as to bring the finger 50 into a position corresponding to the fork-like end I/II, the bushing 4060 translates rigidly with the shaft CS and is brought into a position corresponding to the two actuators 472, 474.

When the speed of the vehicle is higher than a threshold value for safe engagement of the first and/or second forward gears (already discussed previously), an electronic control unit having the task of controlling the actuators 472, 474 sends a command for the exit of the pins 478, 480 by means of an electrical signal. The pins 478, 480 set themselves on opposite sides with respect to the roller 4063, as may be seen in FIG. 11.

Since the bushing 4060 is connected in rotation to the control shaft CS, the exit of the pins and their contact with the roller 4063 (on opposite sides thereof) prevents rotation of the control shaft CS in both of the positions of engagement corresponding to engagement of the first and second forward gears and hence actuation of the synchronizer S1/2, forcing the control shaft to remain in a neutral position that corresponds to an idle condition of the gearbox 1.

Also in this case, it is possible to activate at the same time an acoustic warning and/or a warning light to warn the driver of the hazard.

In the event of the need to control a retraction of the pins 478, 480, the presence of the roller 4063 facilitates this operation. Assuming that the roller 4063 is substantially in contact with just one pin owing to the presence of minor functional play that prevents tangency thereof with the two pins simultaneously, at the interface between the roller and the pin there develops a condition of rolling friction that favours disengagement as compared, for example, to the condition of sliding friction that develops at the interface between the appendages 164, 166 and the pins 176, 178 of the control device 106.

Figure 13:
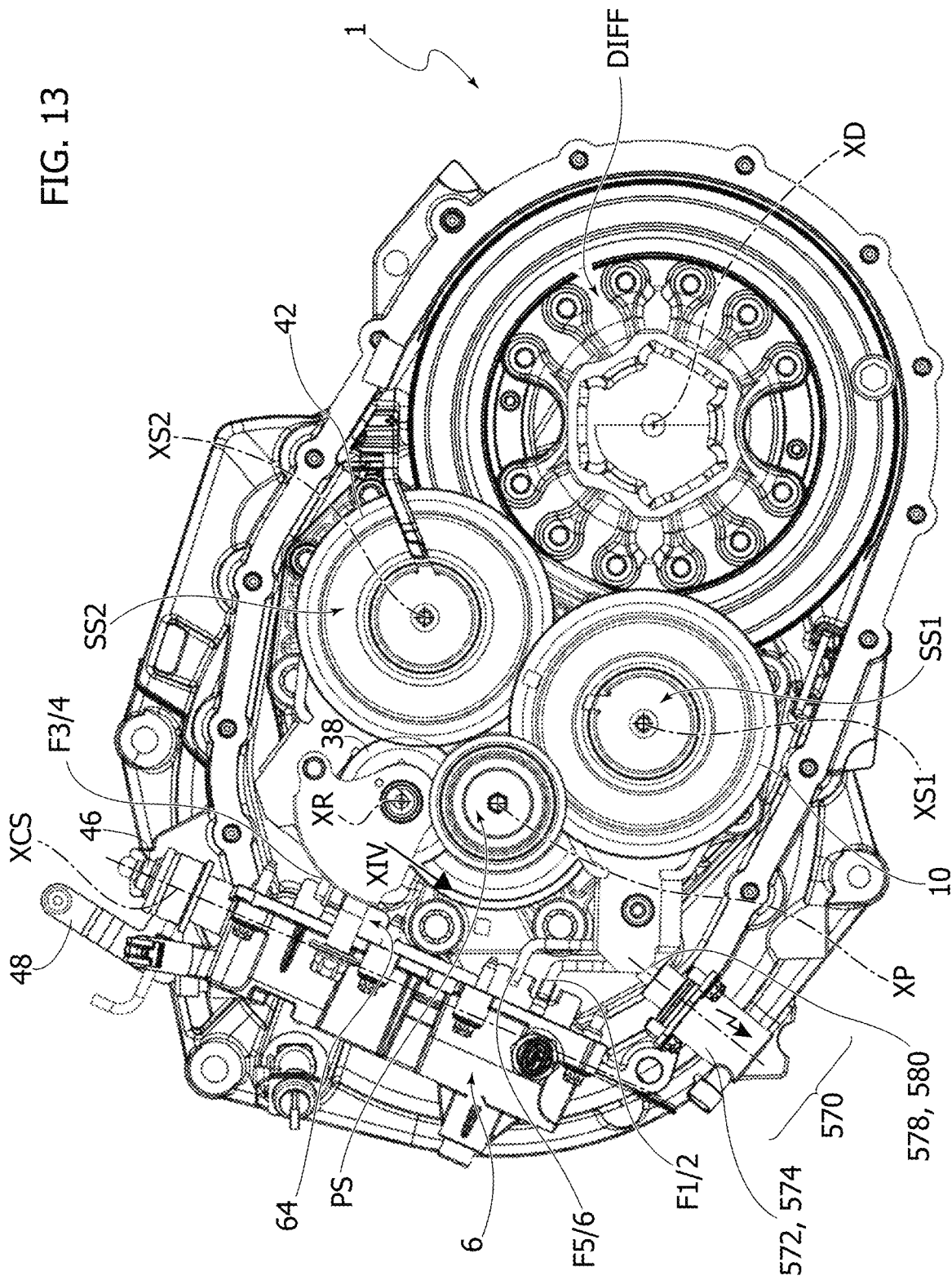
FIG. 13 is a front view corresponding to that of FIG. 2 but representing a gearbox according to a fifth embodiment of the invention.
Figure 14:
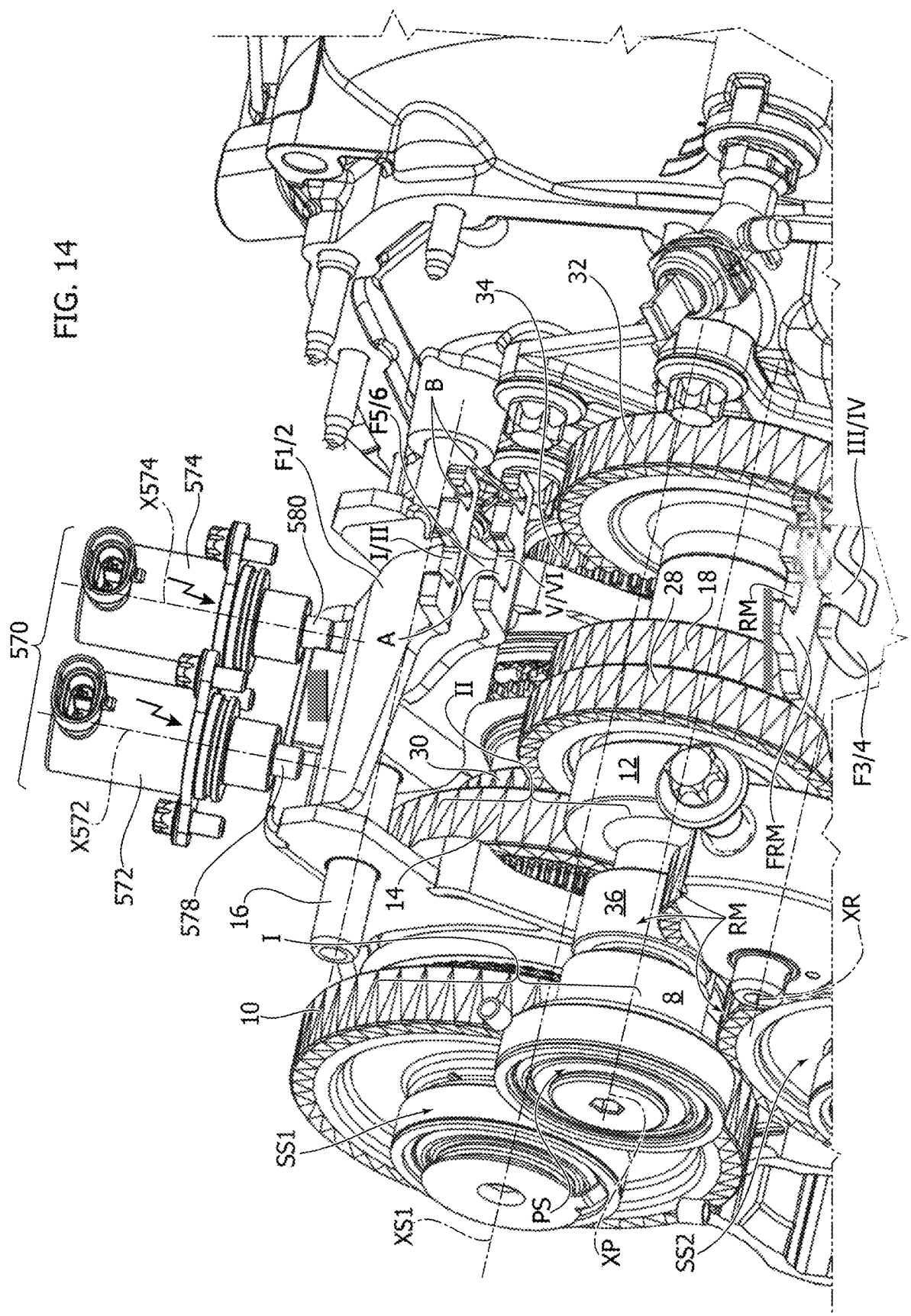
FIG. 14 is a detailed perspective view according to the arrow XIV of FIG. 13.

Finally, with reference to FIGS. 13 and 14, a fifth embodiment of the gearbox according to the invention is here illustrated that differs from all the embodiments so far presented in the use of the control device 6, such as the gearbox 1 of a known type, and moreover differs from the gearbox 1 of a known type owing to the presence of a locking device 570 fixed to the casing 2 and acting, not on the control device 6, but directly on the fork F1/2.

With reference to FIG. 13, the locking device 570 includes a pair of electromagnetic actuators 572, 574 which are configured for movement in an axial direction of corresponding pins 578, 580 that share the longitudinal axes of the actuators X572, X574. The pins are mobile between a (normal, resting) retracted position and an extracted position.

As may be seen in FIG. 13, the electromagnetic actuators 572, 574 are flanged to the casing 2 of the gearbox in the proximity of the fork F1/2, and in particular so that the respective longitudinal axes are incident on the fork itself.

With reference to FIG. 14, in order to co-operate with the actuators 572, 574, the fork F1/2 is provided with a tab 5700 having a development oriented according to a vector parallel to the axes X572, X574 and such as to belong to a plane passing through the aforesaid axes.

The length of the tab 5700 is chosen in such a way that, when the pins 578, 580 are in the extracted position, it is comprised between them and tangential thereto (but for functional tolerances). For this purpose, the length of the tab 5700 is chosen so as to be equal to the centre-to-centre distance between the pins 578, 580 reduced by the diameter of one of them.

Operation of the locking device 570 is described in what follows.

With reference to FIG. 14, in the case where the vehicle on which the gearbox 1 is installed is travelling above a threshold speed for engagement of the first and second gears and the driver in any case controls selection of the engagement plane of the aforesaid gears, an electronic control unit sends an electrical signal to the actuators 572, 574 thus controlling exit of the pins 578, 580.

The latter, by setting themselves on opposite sides with respect to the tab 5700, lock the sliding in an axial direction of the fork F1/2 on the shaft 16, which prevents actuation of the synchronizer S1/2 and thus engagement of the first and second forward gears.

Also in this case, it is possible to associate the event to turning-on of a warning light and and/or an acoustic warning that warns the driver of the hazard.

It should be noted that in this embodiment it is not necessary for the control shaft CS of the control device 6 to be in a position that corresponds to selection of the engagement plane of the first and second gears in so far as locking of the fork F1/2 can occur also when the vehicle is travelling at a speed higher than the threshold speed and another gear is engaged. This is because the action of the locking device 570 develops on the fork F1/2 and not on the control device 6.

The action of the locking device may thus be of a preventive type (and this is the preferred embodiment for achieving this purpose) and would simply add to the action of locking already exerted by the blade 64.

Of course, the details of construction and the embodiments may vary widely with respect to what has been described and illustrated herein, without thereby departing from the scope of the present invention, as defined in the annexed claims.

For example, it is possible to envisage variants of the solutions illustrated herein in which the locking device includes just one electromagnetic actuator, and is consequently able to prevent engagement of just one predetermined forward gear ratio, for example the first gear.

What is claimed is:

1. A gearbox for a motor vehicle including a plurality of forward gear ratios and a reverse gear ratio, the gearbox further including:
    a control device configured for controlling the selection and the engagement of said forward gear ratios and of said reverse gear ratio; and
    a plurality of engagement devices that can be controlled by means of said control device for engaging the forward gear ratios or reverse gear ratio of the gearbox that are operatively associated to said devices,
    wherein the gearbox includes a locking device, which is electrically controlled and configured for preventing actuation of the engagement device associated to a predetermined forward gear ratio, said locking device being configured for being actuated above a threshold speed of a motor vehicle on which said gearbox is installed,
    wherein said predetermined forward gear ratio includes a first gear ratio,
    wherein said locking device includes at least one actuator configured for displacing a pin between an extracted position and a retracted position,
    wherein said control device includes a case fixed to a casing of said gearbox and a control shaft rotatably mounted and axially movable within said case,
    said control shaft comprising a first radial engagement finger and a second radial engagement finger for controlling corresponding devices for engagement of the forward gear ratios and of the reverse gear ratio, and
    said locking device comprising a bushing connected in rotation to said control shaft and axially movable with respect thereto, said bushing being countered in the axial movement of the control shaft by an elastic element, said at least one actuator of said locking device including at least one electromagnetic actuator fixed to said case.

2. The gearbox according to claim 1, wherein, when the control shaft is in a position that makes the selection of the engagement plane of said predetermined forward gear ratio, aid bushing bears upon a contrast element fixed to a wall of the case of said control device, said bushing moreover bearing a radial tab configured to come into contact with the pin of said at least one electromagnetic actuator of said locking device when the pin is in the extracted position.

3. The gearbox according to claim 1, wherein said predetermined forward gear ratio further includes a second gear ratio.

4. The gearbox according to claim 3, wherein said at least one actutor of said locking device includes two electromagnetic actuators fixed to said case, wherein, when the control shaft is in a position that makes the selection of the engagement plane of said predetermined forward gear ratio, said bushing bears upon a contrast element fixed to a wall of the case of said control device, said bushing moreover bearing a radial tab configured to come into contact with the pins of the electromagnetic actuators of the locking device when the pins are in the extracted position.

5. The gearbox according to claim 2, wherein, when the control shaft is shifted axially into a position that makes the selection of the engagement plane of said reverse gear ratio, said control shaft slides axially with respect to said further bushing thereby reducing the axial distance thereof with respect to the engagement bushing that bears said first radial engagement finger, said approach being obtained by compression of said elastic element.

6. The gearbox according to claim 1, wherein, to each predetermined forward gear ratio of which the locking device is configured for preventing engagement, a corresponding and distinct threshold speed of said motor vehicle is associated.

* * * * *